Patented July 12, 1932

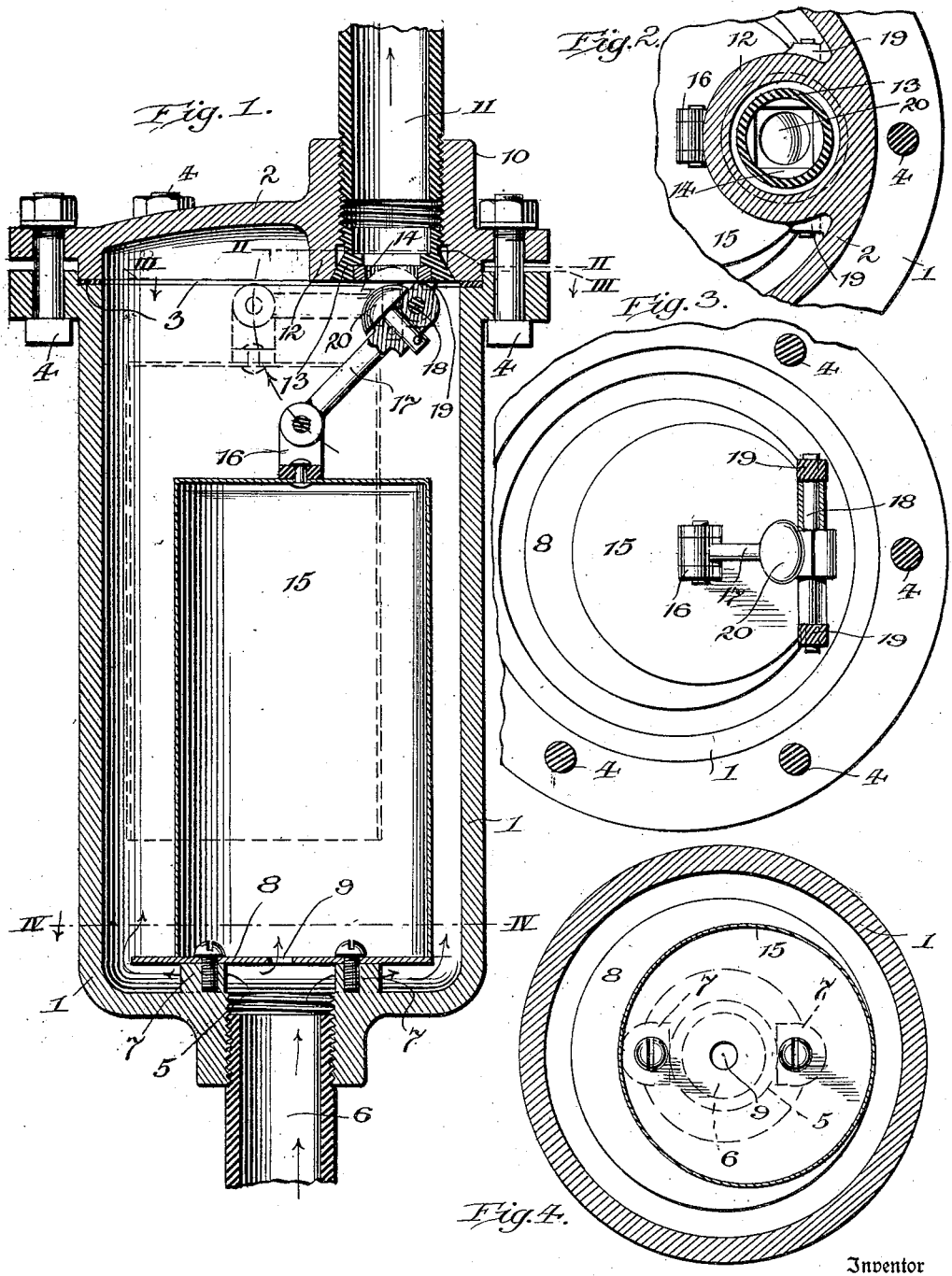

1,867,434

UNITED STATES PATENT OFFICE

CARL W. ZIES, OF LAKEWOOD, OHIO, ASSIGNOR TO THE V. D. ANDERSON COMPANY, OF CLEVELAND, OHIO, A CORPORATION OF OHIO

STEAM TRAP

Application filed January 26, 1931. Serial No. 511,340.

This invention pertains to steam traps and has for its object the production of a trap which while simple and containing few parts is nevertheless highly efficient.

A trap embodying my invention is illustrated in the annexed drawing wherein:

Figure 1 is a vertical sectional view of the trap;

Figure 2, a detail horizontal section taken on the line II—II of Figure 1;

Figure 3, a similar view on the line III—III of the same Figure; and

Figure 4, a horizontal sectional view on the line IV—IV of Figure 1.

In the drawing 1 denotes the shell or casing to the upper end of which is secured a top or cover 2, sealed to the shell by a gasket 3 and bolts 4.

At its lower end the shell is provided with a central opening 5 into which is screwed the inlet pipe 6. Extending upwardly from the inner face of the bottom wall of the shell is a plurality of lugs 7 (two being shown) to which is secured a baffle plate 8 having an aperture 9 formed therein. As will be seen, the edge of plate 8 is spaced away from the surrounding wall of the shell 1 so that the interior of the shell is in free communication at all times with pipe 6.

Cover 2 is formed with a nipple 10 into which is threaded a pipe 11. A second nipple 12, which in a sense is a continuation of nipple 10, extends inwardly of the cover and is counterbored and conformed to receive a bushing 13 in which is mounted a valve seat 14.

An inverted bucket, denoted by 15, is placed within the shell 1 and a yoke 16 is secured to the upper end thereof. To said yoke is pivotally attached an arm or lever 17 fulcrumed at its opposite end upon a pin or shaft 18, see more particularly Figure 3, supported by a pair of ears 19 extending inward from the cover 2.

A valve 20 is removably mounted in the lever and when the bucket is fully raised, as will hereinafter appear, the valve bears against its seat and closes off communication between the interior of the shell or casing and pipe 11.

With the parts proportioned as shown in the drawing, the lower open end of the bucket or float is of a diameter less than that of the baffle plate. Such arrangement, however, is not essential as the parts may be so proportioned that the bucket would extend outwardly beyond the edge of the baffle. Under either arrangement there is but a slight tendency of the incoming water to pass upwardly into the bucket as the water is primarily deflected in an outward direction toward the inner wall of the shell 1 and past the lower end of the bucket. Of course a certain amount of water will pass through the orifice 9, which is relatively small as compared to the capacity of the float or bucket 15. Thus a major part of the liquid or water is diverted around the float so that the rush or velocity of the liquid will not force the float upward.

The operation of the trap may be stated as follows:

When the trap is installed with the pipe connection 6 leading from a heating apparatus and the trap filled with water it is then ready to begin one cycle of its operation. At this time the bucket is in its lowest position with the lower edge thereof resting upon the baffle plate 8 as shown in full lines in Figure 1.

Water entering the trap is prevented from impinging on the bucket due to the baffle plate, the orifice 9 therein being relatively small so that only a small amount of water will flow through said opening. Such amount, however, is not enough to force the float or bucket toward the top of the structure. When, however, the amount of inflowing water is in excess of the capacity of the gas orifice the excess water will be diverted to the sides of the baffle plate or diaphragm and pass up on the outside of the bucket. This permits the bucket to remain in its lowermost position thereby holding the valve entirely off the seat, permitting a 100% orifice opening therethrough;—consequently no throttling effect inheres.

When all the condensate has been discharged from the apparatus the entering steam, being a gas, rises or passes through the orifice 9 and causes the water in the bucket to be displaced by steam thereby imparting buoyancy to the bucket, causing it to rise and through such action to close the valve. Thus the escape of steam is prevented and the bucket remains in its elevated position until water again enters the trap, condensing the steam in the bucket and causing it to drop and come to rest on the baffle.

What is claimed is:

1. In a trap, the combination of a float chamber having an inlet at its lower end and an outlet at its upper end; a baffle plate overlying the inlet and standing in spaced relation thereto and to the lower inner portion of the chamber and to the adjacent side walls thereof, said plate having a relatively small opening formed therein; a float mounted in the chamber, said float standing entirely above the upper face of the baffle plate; and a valve associated with said float adapted when the float is raised to close the outlet opening in the upper portion of the chamber.

2. In a trap, the combination of a float chamber having a centrally disposed inlet at its lower end and a discharge opening at its upper end; a baffle plate located within the lower portion of the chamber, said plate overlying the inlet in spaced relation thereto and having an opening formed therein in line with the inlet opening in the chamber and said plate being spaced from the bottom and side walls of said chamber; a float located above said plate, the lower open end of said float being of such dimension as to be closed by the plate when the float is lowered thereon except for the opening formed in the plate; a lever pivotally connected to the upper end of the float and to a fixed portion of the trap; and a valve carried by the lever for closing the outlet opening.

3. In a trap, the combination of a float chamber having a centrally disposed inlet opening at its lower end and an outlet opening at its upper end; a plurality of lugs extending upwardly from the inner face of the bottom of the chamber; a baffle plate mounted upon said lugs, said plate having a centrally disposed opening formed therein and the edges of the plate stopping short of the side walls of the chamber; a float located within the chamber, said float being open at its lower end and of a dimension such as to be closed when seated upon the plate except for the opening formed in the latter; a lever pivotally connected at one end to the upper portion of the float and at its opposite end to a fixed portion of the trap; a valve seat mounted in the outlet opening; and a valve carried by the lever and adapted when the float is raised to be forced to the seat to close the outlet opening.

4. In a trap, the combination of a float chamber having an inlet at its lower end and an outlet at its upper end; a baffle plate overlying the inlet and standing in spaced relation thereto and to the lower inner portion of the chamber and to the adjacent side walls thereof, said plate having a relatively small opening formed therein; an inverted bucket-shaped float mounted in the chamber, said float being normally open at its lower end and designed to be closed, in part at least, when in its lowermost position by the baffle plate; and a valve associated with said float acting when the float is raised to close the outlet opening in the upper portion of the chamber.

5. In a trap, the combination of a float chamber having an inlet at its lower end and an outlet at its upper end; a float located in said chamber, the lower end of the float being open; a valve for the outlet; means actuated by the float for opening and closing said valve; and a baffle plate located in the lower portion of the float chamber beneath the float, said plate having a small opening therein and said plate standing above and in spaced relation to the inlet and likewise being spaced from the inner wall of the float chamber whereby liquid passing upwardly through the inlet will be deflected, in the main, by the plate from the open end of the float and into the chamber around and about the float.

In testimony whereof I have signed my name to this specification.

CARL W. ZIES.